US012608535B2

(12) United States Patent (10) Patent No.: US 12,608,535 B2
Santhar et al. (45) Date of Patent: Apr. 21, 2026

(54) AUTOMATED DIGITAL TEXT OPTIMIZATION AND MODIFICATION

(71) Applicant: INTERNATIONAL BUSINESS MACHINES CORPORATION, Armonk, NY (US)

(72) Inventors: Sathya Santhar, Chennai (IN); Sridevi Kannan, Chennai (IN); Sarbajit K. Rakshit, Kolkata (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 17/479,547

(22) Filed: Sep. 20, 2021

(65) Prior Publication Data

US 2023/0090713 A1 Mar. 23, 2023

(51) Int. Cl.
  *G06N 3/044* (2023.01)
  *G06F 40/166* (2020.01)
  (Continued)

(52) U.S. Cl.
  CPC .......... *G06F 40/166* (2020.01); *G06F 40/284* (2020.01); *G06N 3/044* (2023.01); *G06N 3/045* (2023.01)

(58) Field of Classification Search
  CPC .............. G06F 40/166; G06F 40/284; G06N 3/044–045
  See application file for complete search history.

(56) References Cited

U.S. PATENT DOCUMENTS

| 10,783,192 | B1 * | 9/2020 | Soubbotin | ........... G06F 16/2428 |
| 2012/0253792 | A1 * | 10/2012 | Bespalov | .............. G06F 16/353 |
| | | | | 704/9 |

(Continued)

FOREIGN PATENT DOCUMENTS

| CN | 109933808 A | * | 6/2019 |
| CN | 112541073 A | | 3/2021 |
| WO | 2020107878 A1 | | 6/2020 |

OTHER PUBLICATIONS

Jason Brownlee, "How to Configure an Encoder-Decoder Model for Neural Machine Translation", published on Aug. 7, 2019 to https://machinelearningmastery.com/configure-encoder-decoder-model-neural-machine-translation, retrieved Mar. 1, 2025. (Year: 2019).*

(Continued)

*Primary Examiner* — Shourjo Dasgupta
(74) *Attorney, Agent, or Firm* — Harrity & Harrity, LLP

(57) ABSTRACT

A system, method, and computer program product for implementing automated digital text optimization is provided. The method includes receiving during execution of an Internet search process, digital textual content comprising embedded words, morphemes, and phrases. A specified format for generating a summary for the digital textual content is identified and probability distribution attributes are generated with respect to target vocabulary of the digital textual content. Content of the digital textual content is replaced with replacement content and an automated digital summary of the digital textual content is generated thereby enabling optimized operational functionality of a recurrent neural network (RNN) encoder-decoder hardware device. A decoded version of the automated digital summary is presented via a specialized graphical user interface.

20 Claims, 9 Drawing Sheets

(51) Int. Cl.
   G06F 40/284          (2020.01)
   G06N 3/045          (2023.01)

(56)                    References Cited

U.S. PATENT DOCUMENTS

| | | | |
|---|---|---|---|
| 2019/0034537 A1 | 1/2019 | Boni | |
| 2019/0325066 A1* | 10/2019 | Krishna | G06F 16/3347 |
| 2020/0242197 A1* | 7/2020 | Srinivasan | G06N 3/08 |
| 2020/0257757 A1 | 8/2020 | Chawla | |

OTHER PUBLICATIONS

Jason Brownlee, "How Does Attention Work in Encoder-Decoder Recurrent Neural Networks", published on Aug. 7, 2019 to https://machinelearningmastery.com/how-does-attention-work-in-encoder-decoder-recurrent-neural-networks, retrieved Mar. 1, 2025. (Year: 2019).*

David S. Batista, "The Attention Mechanism in Natural Language Processing", published on Jan. 25, 2020 to https://www.davidsbatista.net/blog/2020/01/25/Attention-seq2seq, retrieved Mar. 1, 2025. (Year: 2020).*

Kyunghyun Cho, etc., "On the Properties of Neural Machine Translation: Encoder-Decoder", publ. via Proceedings of SSST-8, Eighth Workshop on Syntax, Semantics and Structure in Statistical Translation, pp. 103-111, Oct. 25, 2014, Quata, retr. from https://aclanthology.org/W14-4012.pdf on Mar. 1, 25. (Year: 2014).*

Harshil Patel, "Neural Machine Translation (NMT) with Attention Mechanism", published Jun. 5, 2020 to https://towardsdatascience.com/neural-machine-translation-nmt-with-attention-mechanism-5e59b57bd2ac, retrieved Mar. 1, 2025. (Year: 2020).*

Shubham Toshniwal, etc., "A Comparison of Techniques for Language Model Integration in Encoder-Decoder Speech Recognition", published Nov. 6, 2018 to arXiv, retrieved Mar. 1, 2025. (Year: 2018).*

Data Science Stack Exchange, "Why do we need to add START and END symbols when using Recurrent Neural Nets for Sequence-to-Sequence Models?", published Jan. 23, 2018 to a URL included by the Examiner at the top of the reference's page, and retrieved Mar. 3, 2025. (Year: 2018).*

Patrick von Platen, "How to generate text: using different decoding methods for language generation with Transformers", published Mar. 1, 2020 to https://huggingface.co/blog/how-to-generate, retrieved Mar. 4, 2025. (Year: 2020).*

Kyunghyun Cho, etc., "Learning Phrase Representations using RNN Encoder-Decoder for Statistical Machine Translation", published on Sep. 3, 2014 to arXiv, retrieved Sep. 15, 2025. (Year: 2014).*

Jason Brownlee, "How to Develop a Neural Machine Translation System from Scratch", published Oct. 6, 2020 to https://machinelearningmastery.com/develop-neural-machine-translation-system-keras, retrieved Sep. 15, 2025. (Year: 2020).*

Jason Brownlee, "How to Develop a Word-Level Neural Language Model and Use it to Generate Text", published Oct. 8, 2020 to https://machinelearningmastery.com/how-to-develop-a-word-level-neural-language-model-in-keras, retrieved Sep. 15, 2025. (Year: 2020).*

Ramesh Nallapati, etc., "Abstractive Text Summarization using Sequence-to-sequence RNNs and Beyond", published Aug. 26, 2016 to arXiv, retrieved Sep. 15, 2025. (Year: 2016).*

Fan, Angela et al.; Controllable Abstractive Summarization; Proceedings of the 2nd Workshop on Neural Machine Translation and Generation; Jul. 20, 2018; pp. 45-55.

Mell, Peter et al.; "The NIST Definition of Cloud Computing;" National Institute of Standards and Technology; Special Publication 800-145; Sep. 2011; 7 pages.

Saito, Itsumi et al.; Length-controllable Abstractive Summarization by Guiding with Summary Prototype; arXiv:2001.07331v1; Jan. 21, 2020; 8 pages.

* cited by examiner

RECEIVE DIGITAL CONTENT ~200

IDENTIFY FORMAT ~202

GENERATE ATTRIBUTES ~204

REPLACE CONTENT ~208

GENERATE DIGITAL SUMMARY ~210

ENABLE HARDWARE INTERFACE FUNCTIONALITY ~212

PRESENT DIGITAL SUMMARY ~214

ALTER HARDWARE/ SOFTWARE FUNCTIONALITY ~216

AUTOMATED DIGITAL TEXT OPTIMIZATION AND MODIFICATION

BACKGROUND

The present invention relates generally to a method for modifying digital text and in particular to a method and associated system for improving software technology associated with identifying a specified format for generating a summary for digital textual content generating an automated digital summary of the digital textual content thereby enabling optimized operational functionality of a recurrent neural network (RNN) encoder-decoder hardware device.

SUMMARY

A first aspect of the invention provides a recurrent neural network (RNN) encoder-decoder hardware device comprising a processor coupled to a computer-readable memory unit, the memory unit comprising instructions that when executed by the processor implements an automated digital text optimization method comprising: receiving, by the processor during execution of an Internet search process, digital textual content comprising embedded words, morphemes, and phrases; identifying, by the processor via executing token appending code, a specified format for generating a summary for the digital textual content; generating, by the processor via a decoder component of the RNN encoder-decoder hardware device with respect to the specified format, probability distribution attributes with respect to target vocabulary of the digital textual content; replacing, by the processor in response to analysis of the probability distribution attributes, content of the digital textual content with replacement content; generating, by the processor, an automated digital summary of the digital textual content thereby enabling optimized operational functionality of the RNN encoder-decoder hardware device; and presenting, by the processor to a user via a specialized graphical user interface (GUI), a decoded version of the automated digital summary.

A second aspect of the invention provides a automated digital text optimization method comprising: receiving, by a processor of a recurrent neural network (RNN) encoder-decoder hardware device during execution of an Internet search process, digital textual content comprising embedded words, morphemes, and phrases; identifying, by the processor via executing token appending code, a specified format for generating a summary for the digital textual content; generating, by the processor via a decoder component of the RNN encoder-decoder hardware device with respect to the specified format, probability distribution attributes with respect to target vocabulary of the digital textual content; replacing, by the processor in response to analysis of the probability distribution attributes, content of the digital textual content with replacement content; generating, by the processor, an automated digital summary of the digital textual content thereby enabling optimized operational functionality of the RNN encoder-decoder hardware device; and presenting, by the processor to a user via a specialized graphical user interface (GUI), a decoded version of the automated digital summary.

A third aspect of the invention provides a computer program product, comprising a computer readable hardware storage device storing a computer readable program code, the computer readable program code comprising an algorithm that when executed by a processor of a RNN encoder-decoder hardware device implements an automated digital text optimization method, the method comprising: receiving, by the processor during execution of an Internet search process, digital textual content comprising embedded words, morphemes, and phrases; identifying, by the processor via executing token appending code, a specified format for generating a summary for the digital textual content; generating, by the processor via a decoder component of the RNN encoder-decoder hardware device with respect to the specified format, probability distribution attributes with respect to target vocabulary of the digital textual content; replacing, by the processor in response to analysis of the probability distribution attributes, content of the digital textual content with replacement content; generating, by the processor, an automated digital summary of the digital textual content thereby enabling optimized operational functionality of the RNN encoder-decoder hardware device; and presenting, by the processor to a user via a specialized graphical user interface (GUI), a decoded version of the automated digital summary.

The present invention advantageously provides a simple method and associated system capable of automating digital text modification.

DETAILED DESCRIPTION

Figure 1:
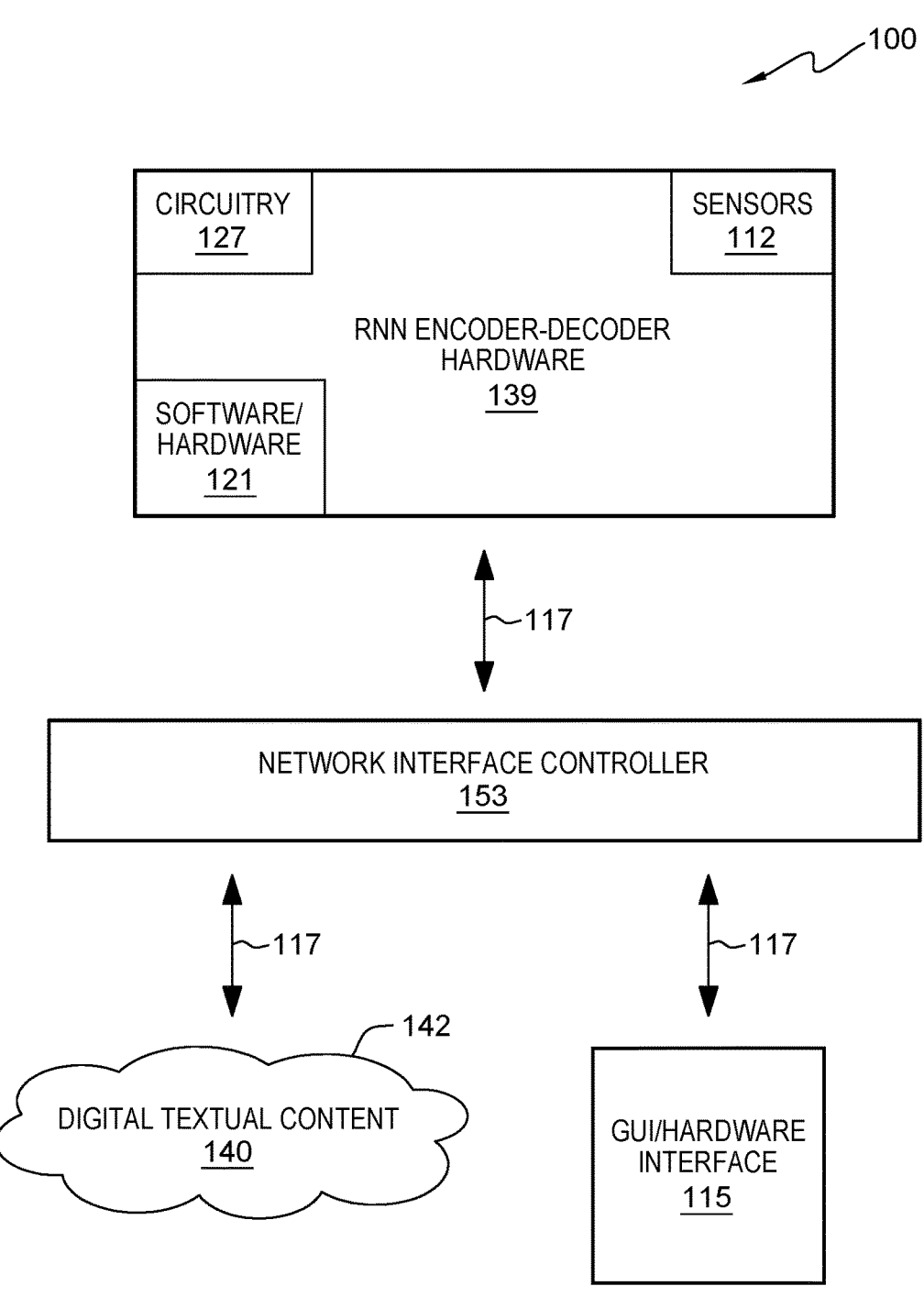
FIG. 1 illustrates a system for improving software technology associated with identifying a specified format for generating a summary for digital textual content generating an automated digital summary of the digital textual content thereby enabling optimized operational functionality of a recurrent neural network (RNN) encoder-decoder hardware device, in accordance with embodiments of the present invention.

FIG. 1 illustrates a system 100 for improving software technology associated with identifying a specified format for generating a summary for digital textual content generating an automated digital summary of the digital textual content thereby enabling optimized operational functionality of a recurrent neural network (RNN) encoder-decoder hardware device 139, in accordance with embodiments of the present invention. Internet Web pages, news articles, status updates, and blogs typically comprise a large amount of unstructured data for navigation. Likewise, manual text summarization processes may be performed for condensing a piece of text to a shorter version thereby reducing a size of the initial text while simultaneously preserving key informational elements and a meaning of the content for creating a coherent and fluent summary comprising main points outlined in a document. Additionally, typical manual text summarization processes enable mechanisms for allowing a reader to control few important aspects of a generated summary such as length, entities, style etc, but do not give a user flexibility to condition words available within a generated summary. Therefore, system 100 is configured to enable important aspects of a summary to be controlled by a user in a flexible manner by allowing a choice for word selection to be retained in a generated summary. Likewise, system 100 enables optimization of an automated text summarization process by enabling a user to control a digital token of an original sentence that is required to be retained as part of a generated digital text summary.

System 100 of FIG. 1 includes a recurrent neural network (RNN) encoder-decoder hardware device 139, a network 142 comprising digital textual content 140, a graphical user interface (GUI) hardware interface 115, and a network interface controller interconnected through a network 7. RNN encoder-decoder hardware device 139 comprises sensors 112, circuitry 127, and software/hardware 121. RNN encoder-decoder hardware device 139 may comprise any type of hardware based interface including, inter alia, a virtual reality interface, etc. RNN encoder-decoder hardware device 139 and GUI hardware interface 115 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, RNN encoder-decoder hardware device 139 and GUI hardware interface 115 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software technology associated with identifying a specified format for generating a summary for digital textual content generating an automated digital summary of the digital textual content thereby enabling optimized operational functionality of a RNN encoder-decoder hardware device. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 comprises an RNN encoder-decoder based architecture enabling a digital word embedding layer to be followed by attention (hardware/software) modules for allowing a decoder component to emphasize relevant portions of an input document to be executed for generating a next token thereby accepting conditioned text as a token. System 100 enables the following processes: word centric text summarization processing, enriched probability calculation processes, word selection replacement, and enhancement of digital text summarization processes.

Word centric text summarization processing enables a reader to generate a summary focusing on a specific word/token within an original source text as follows: a <start> and an <end> digital token is appended before and after a word of interest respectively. The appended structure is used as input in combination with lengthy source text. The digital token may be separated from a main text and may be used as additional inputs in combination with an original sentence.

Enriched probability calculation processes include passing a user choice of word into an input in combination with source text. In response, two types of conditional probability scores are calculated at each time level (level 1 and level 2). Level 1 processing enables a process for calculating a probability that an output (digital) word comprises a target word conditioned for a given input (retrieved from an encoder component) and a predicted word from a previous time level. A digital word comprising a highest probability score is considered to be a predicted target word. A current digital word may be conditioned with respect to a previous word(s) and a probability of words in located within a digital dictionary. Level 2 processing enables a process for calculating a probability that an output target word comprises a user choice of word conditioned for a given input from an encoder component and a predicted word from a previous time step thereby generating a probability score associated with a user choice of word.

Word selection replacement processes are configured for replacing a choice of a word. For example, after completing one iteration of generating a text summary, it may be verified if a user choice of word has already been encountered within a generated summary. If the user choice of word has already been encountered within the generated summary, then a goal for retaining a selected user choice of word is achieved automatically. If the user choice of word has not been encountered within the generated summary, then calculated conditional probability scores (of Level 2) of the user choice of word at each time step are compared and a timestep producing a highest score is selected. A corresponding predicted word (at the timestep) is replaced with the user choice of word and a text summarization iteration continues from the time step with replaced text comprising a word of interest.

Enhancement of digital text summarization processes ensure that a generated summary retains a user choice of word simultaneously with usage of a best summarization technique to generate an optimized summary of the digital source text.

Figure 2:
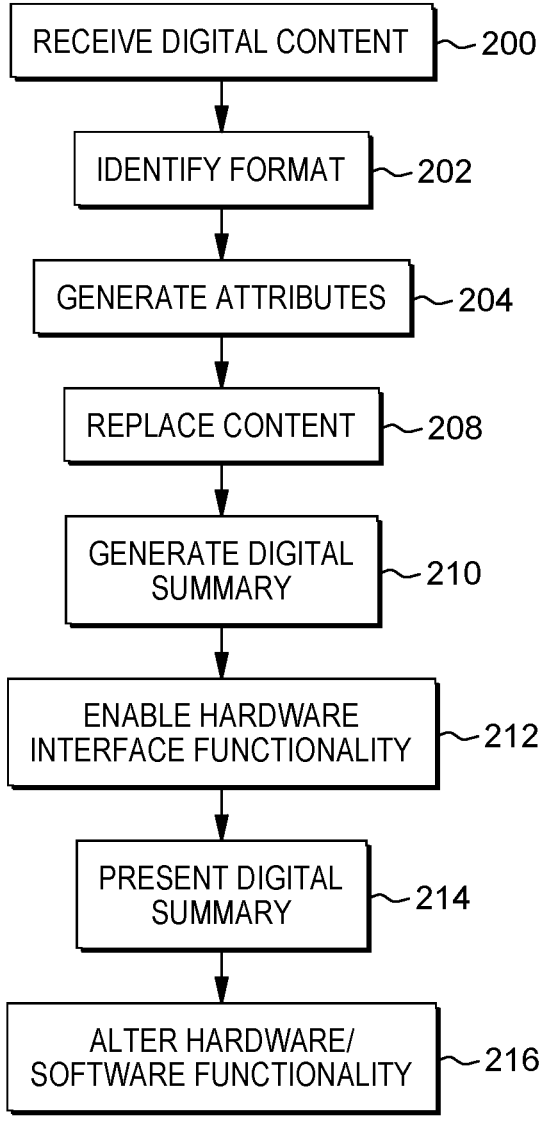
FIG. 2 illustrates an algorithm detailing a process flow enabled by the system of FIG. 1 for improving software technology associated with identifying a specified format for generating a summary for digital textual content generating an automated digital summary of the digital textual content thereby enabling optimized operational functionality of a RNN encoder-decoder hardware device, in accordance with embodiments of the present invention.

FIG. 2 illustrates an algorithm detailing a process flow enabled by system 100 of FIG. 1 for improving software technology associated with identifying a specified format for generating a summary for digital textual content generating an automated digital summary of the digital textual content thereby enabling optimized operational functionality of a recurrent neural network (RNN) encoder-decoder hardware device, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by RNN encoder-decoder hardware device 139 and GUI hardware interface 115 of FIG. 1. In step 200, digital textual content (comprising embedded words, morphemes, and phrases) is received during execution of an Internet search process. Receiving the digital textual content may include:

1. Reading (via an encoder component of the RNN encoder-decoder hardware device) source strings of the digital textual content.
2. Encoding the source strings with respect to a hidden digital state.
3. Determining importance attributes for each source string with respect to a context vector.
4. Predicting (via the decoder component) a next word in the source strings with respect to an associated previous word.
5. Determining a gradient of the error of the source strings.

In step 202, a specified format for generating a summary for said digital textual content is identified via execution of token appending code. Identifying the specified format may include:

1. Prepending digital start tokens to a beginning portion of words of interest of the digital textual content.
2. Appending digital end tokens to an ending portion of the words of interest of the digital textual content.

In step 204, probability distribution attributes are generated (via a decoder component of a RNN encoder-decoder hardware device) with respect to target vocabulary of the digital textual content. Generating the probability distribution attributes may include:

1. Selecting top k+n target words, where k equals a user defined beam width and n equals a number of words to be retained within the automated digital summary.
2. Feeding the top k+n target words into the decoder component. Results of feeding the top k+n target words into the decoder component may indicate that a group of words of the top k+n target words include user word selections.

In step 208, content of the digital textual content is replaced with replacement content in response to analysis of the probability distribution attributes. Replacing the content of the digital textual content may include:

1. Comparing the probability distribution attributes.
2. Selecting (in response to results of the comparing) a time step associated with a highest probability distribution attribute of the probability distribution attributes.
3. Replacing corresponding predicted words of the of said digital textual content in accordance with results of the selection.

In step 210, an automated digital summary of the digital textual content is generated thereby enabling optimized operational functionality of the RNN encoder-decoder hardware device. In step 212, functionality of a specialized hardware graphical user interface (GUI) is enabled for operation. The specialized GUI may include a virtual reality (VR) interface device.

In step 214, a decoded version of the automated digital summary is presented to the user via the specialized hardware GUI. In step 216, hardware and software functionality of the RNN encoder-decoder hardware device and/or the specialized hardware GUI is altered via execution of the automated digital summary.

Figure 3:
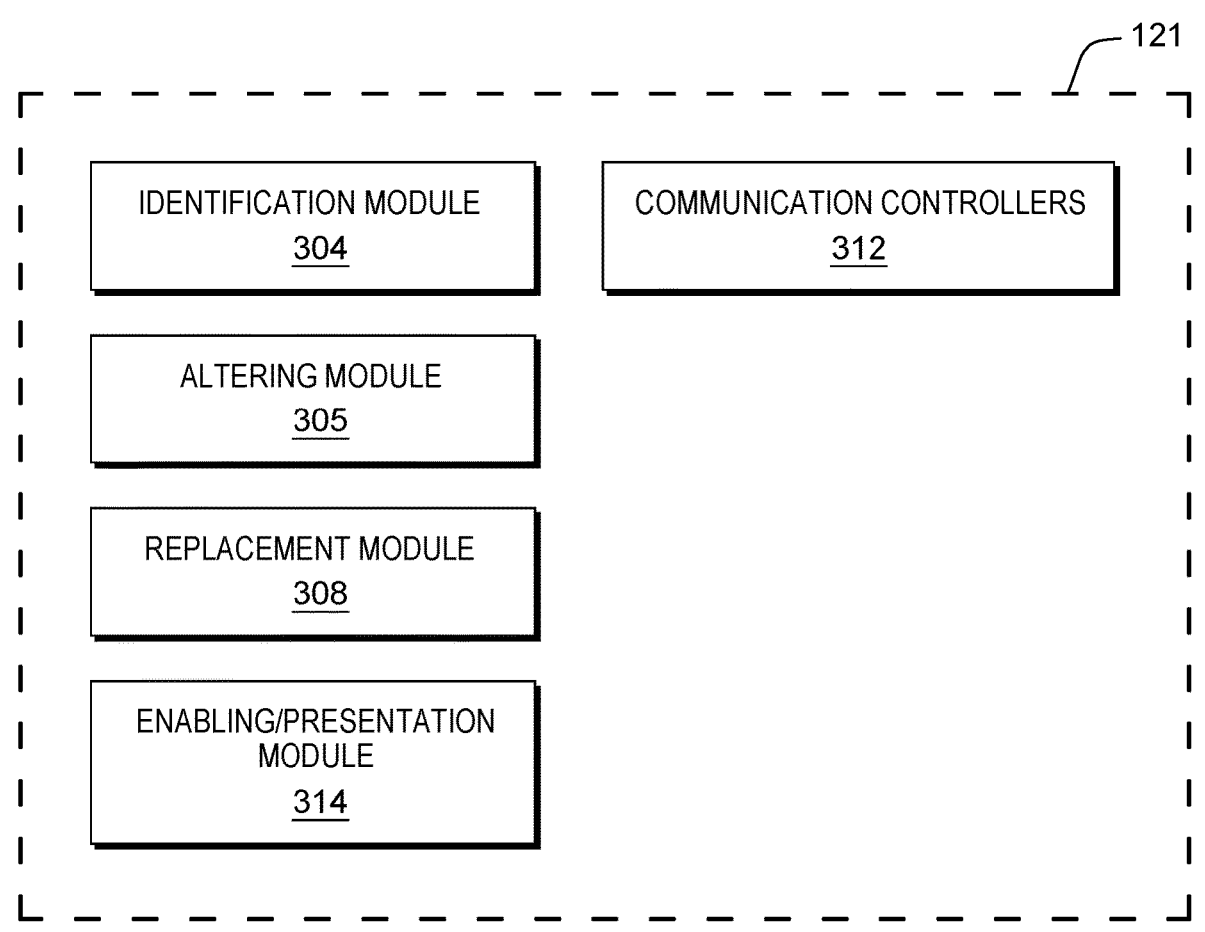
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes an identification module 304, an altering module 305, a replacement module 308, a presentation/enabling module 314, and communication controllers 312. Identification module 304 comprises specialized hardware and software for controlling all functions related to the identification steps of FIG. 2. Altering module 305 comprises specialized hardware and software for controlling all functionality related to the altering steps described with respect to the algorithm of FIG. 2. Replacement module 308 comprises specialized hardware and software for controlling all functions related to the replacement steps of FIG. 2. Presentation/enabling module 314 comprises specialized hardware and software for controlling all functions related to the hardware/software enabling and presentation steps of the algorithm of FIG. 2. Communication controllers 312 are enabled for controlling all communications between identification module 304, altering module 305, replacement module 308, and presentation/enabling module 314.

Figure 4A:
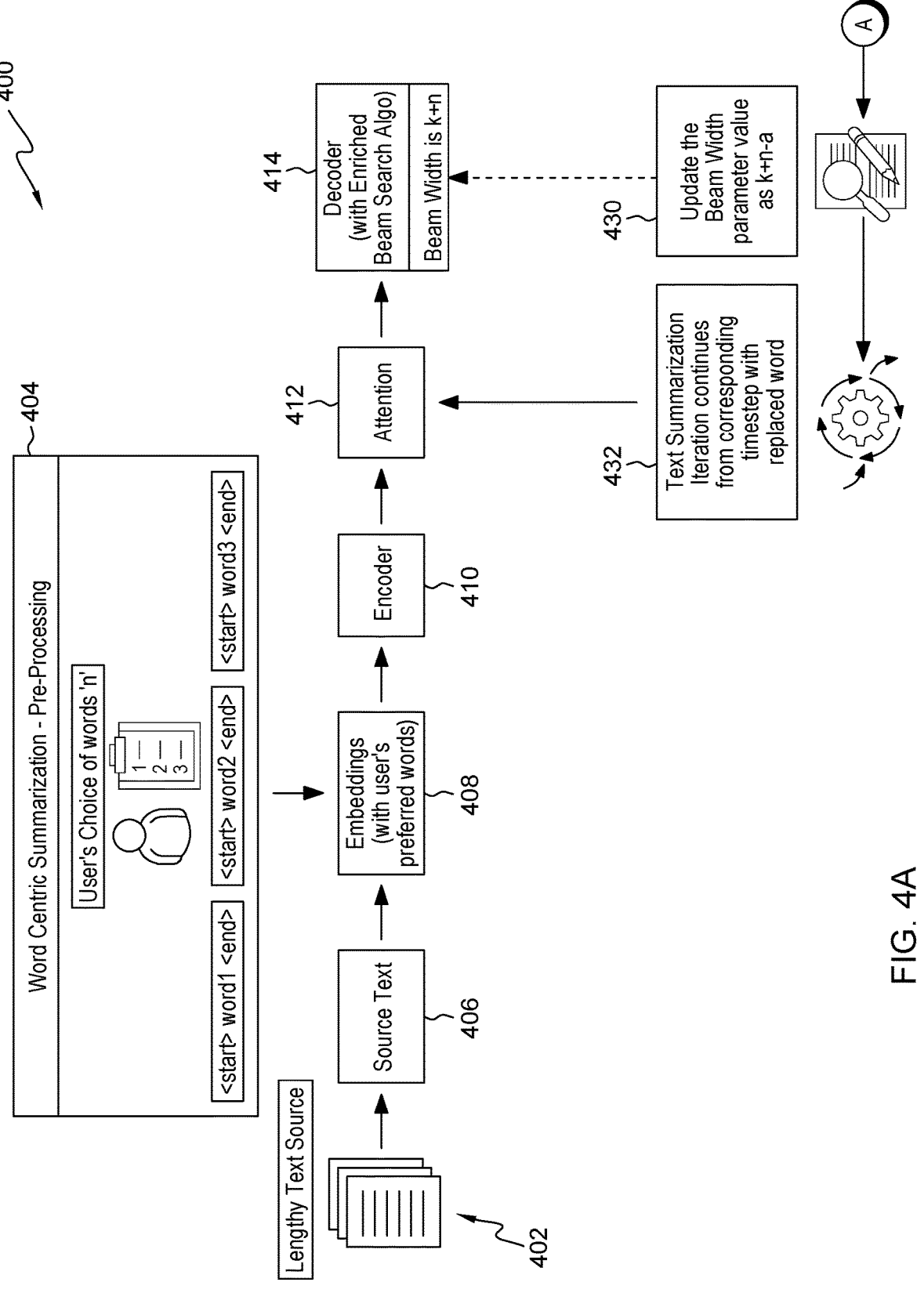
FIGS. 4A and 4B illustrate digital text summarization model architecture, in accordance with embodiments of the present invention.
Figure 4B:
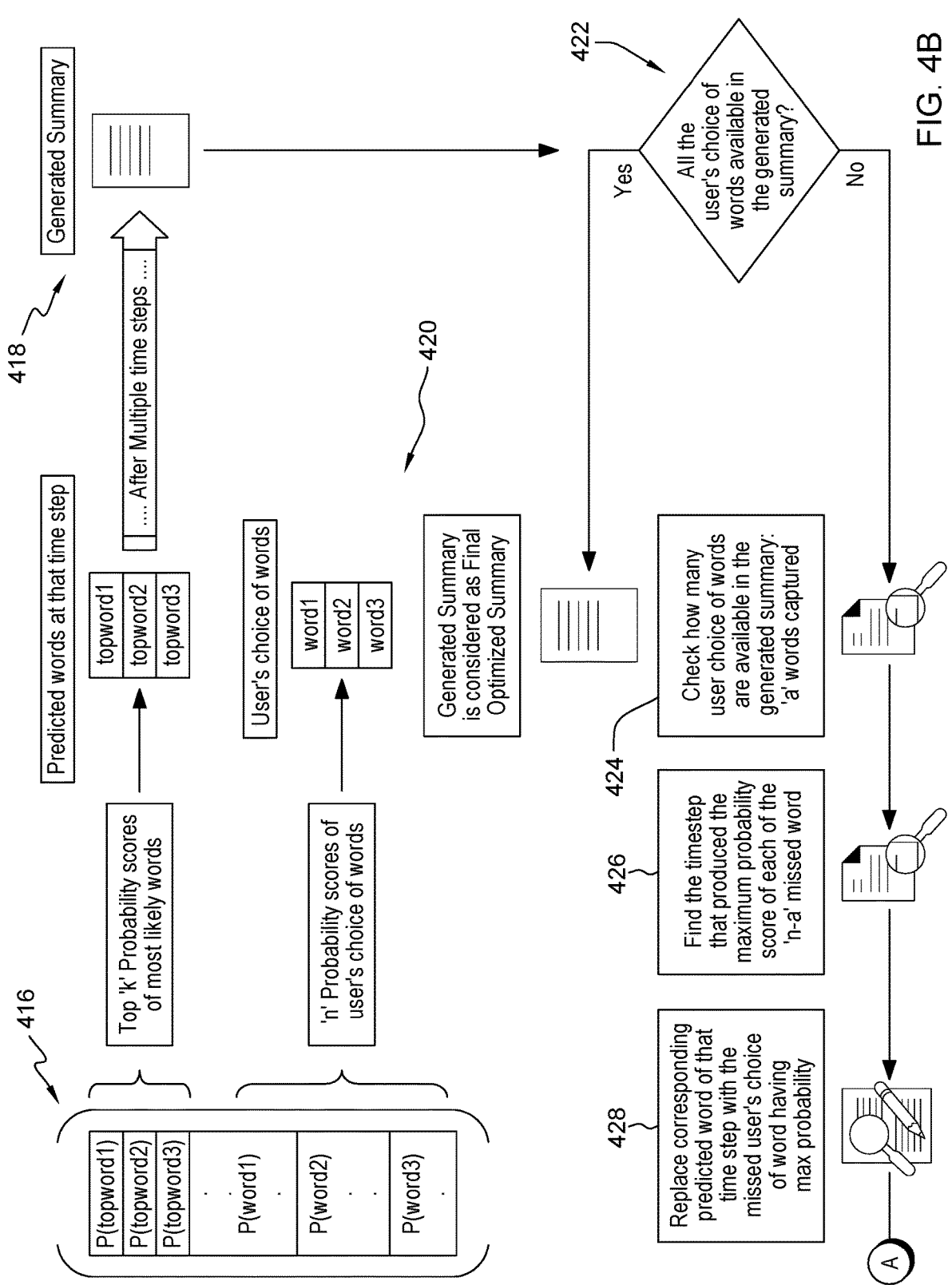

FIGS. 4A and 4B illustrate digital text summarization model architecture 400, in accordance with embodiments of the present invention. Digital text summarization model architecture 400 is configured to evaluate a source (digital) sentence via a text summarization process associated with a user preference for retaining 2 words (e.g., word1 and word2) from an original source sentence within a generated summary. A process for generating an optimized text summary in accordance with a user's preference is described as follows:

An input 402 to a model comprises source text requiring conditional summarization. A source text input 406 entered into an RNN comprises word/morpheme/phrase embeddings. Likewise, a reader system 404 is configured to generate a summary to focus on a specific word/(digital) token located within an original source text. Additionally, a <start> token may be prepended and an <end> token may be appended to words of interest (i.e., word1 and word2). The aforementioned tokens and words of interest is associated with the input embedding along in combination with lengthy source text as follows:

<start> word1<end>

<start> word2<end>

A word embedding component 408 is configured for summarization. Word embedding component 408 comprises the source text as and a user's preference as a conditional input. Encoder component 410 is configured to retrieve a source string word by word and encode the source string as a hidden state for transmission. During transmission, encoder component 410 (e.g., Bi-directional RNN) generates an encoding of the string for capturing all information and context of the input string. Attention layer component 412 is configured to determine an importance level for input encoding via execution of a similarity check between a decoder output and input encodings thereby generating an importance vector. Subsequently, the importance vector is converted into probabilities via passage through specialized software. A resulting context vector is formed by via processing of encodings. A context vector is fed into two layers to generate distribution over sampled vocabulary.

A decoder component 414 is configured to read an entire target sequence word-by-word and predict a same sequence offset by one timestep. Decoder component 414 is trained to predict a next word in the sequence given a previous word. Decoder component 414 may be configured to emphasize portions of an input document that are most relevant for generating a next token based on attention output.

A decoder probability O/P component 416 comprises an enhanced beam search algorithm for generating two types of conditional probability scores at each time step (level 1 and level 2) outputted from decoder probability O/P component 416. During the Level 1 time step, a probability of an output word being a target word conditioned for the given input from encoder component 410 is calculated. A word comprising a highest probability score is considered to be a predicted target word. During the Level 2 time step, a probability of an output word being a user's choice of word is calculated (e.g., 2 words). Therefore, a probability score for both words (e.g., word1 and word2) conditioned for the given input from encoder component 410 is calculated.

An initial text summary 418 is generated. The initial text summary 418 may or may not comprise all user preferred words. Conditional component 422 is configured to (after completing one iteration of generating initial text summary 418), verify if the user's choice of words were already encountered within initial text summary 418. If both words were retained as part of initial text summary 418, then component 420 is configured to retain the selected user's choice of words automatically. If both words were not retained as part of initial text summary 418, then component 424 is configured to compare the calculated conditional probability scores (of Level 2) of the word1 and word2 at each time step to determine how many user choice of words are available within initial text summary 418. Component 426 is configured to locate a timestep producing a highest probability score for each missed word. Component 428 is configured to replace a corresponding predicted word of a time step with a missed user's choice of word comprising a maximum probability. Subsequently, a next text summarization iteration continues from the time step and replaced text comprises the missing user preferred word. Component 430 is configured to update a beam width parameter value such that a next iteration produces updated probability values for the missing words. Component 432 is configured to enable a text summarization iteration to continue from a corresponding timestep with the replaced word. After a complete iteration, a generated text summary comprises word1 and word 2 as per a user preference. A same iteration process may be followed for any number of user preferred words.

An enhanced beam search algorithm may be enabled as follows:

Top k+n most likely target words are selected such that k comprises a user defined beam width and n comprises a number of words that a user prefers to retain within a generated summary (e.g., n=2). The top k+n most likely target words are feed into a next decoder input such that at each time-step t, the decoder retrieves k+n different possible inputs. Subsequently, the top k+n most likely target words for each of the different inputs are generated and only the top-k out of the entire vocabulary size are retained. The aforementioned process continues thereby ensuring that each target word may be associated generating the summary.

Figure 5:
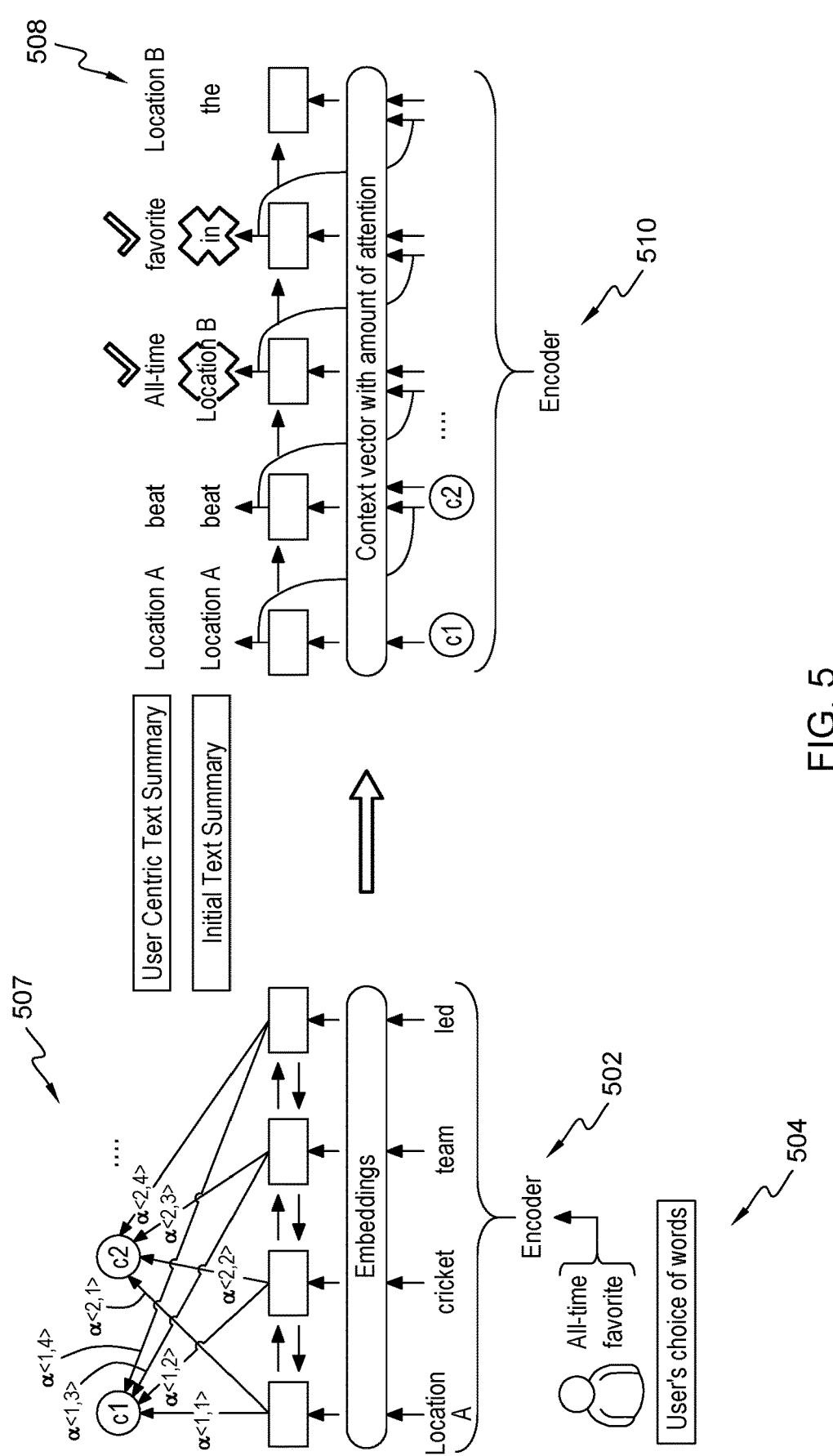
FIG. 5 illustrates encoder/decoder RNN attention model architecture, in accordance with embodiments of the present invention.

FIG. 5 illustrates an example encoder/decoder RNN attention model architecture 500, in accordance with embodiments of the present invention. Encoder/decoder RNN attention model architecture 500 comprises an RNN based encoder-decoder architecture enabled for allowing a word embedding layer to be followed by attention modules thereby allowing a decoder to emphasize portions of an input document that are relevant for generating a next token. Encoder/decoder RNN attention model architecture 500 comprises an encoder 502 (comprising input 504 and an attention layer 507) and a decoder 510 comprising output 508.

Encoder 502 is configured to reads in a source string word by word and encode the information in a hidden state and pass the context forward. After completing a pass, the encoder 502 an encoding of the string or a though vector. For example, input 504 may comprise a sentence requiring summarization (i.e., source text) as follows:

"Cricket Team A led by MS Dhoni emerged victorious in the biggest win against the all-time favorite Cricket Team B within an on-going T20 match series held in Location A"

A user's preferred word may be determined as: all-time favorite such that if a user requests to retain the phrase "all-time favorite" in a generated summary, attention layer 507 may be used to calculate an importance for each input encoding for a current step via execution of a similarity check between a decoder output and input encodings thereby generating an importance vector. A subsequent context vector is generated by multiplying encodings. The context vector is fed into two layers to generate a distribution over sampled vocabulary.

Decoder 510 is configured to read an entire target sequence word-by-word and predict a same sequence offset by one timestep. Decoder 510 is trained to predict a next word in the sequence given the previous word. Decoder 510 may be configured to emphasize relevant portions of the input document for generating a next token based on the attention output. Output from the decoder may include:

An automated (initial) summarized version: Team A beat Team B in the Location A T20 cricket match Likewise, a further summarized version may include:

Team A beat the all-time favorite team B in the Location A T20 cricket match. The further summarized version has been generated via execution of the following string: User Conditioning: <start> all-time favorite <end>.

Figure 6:
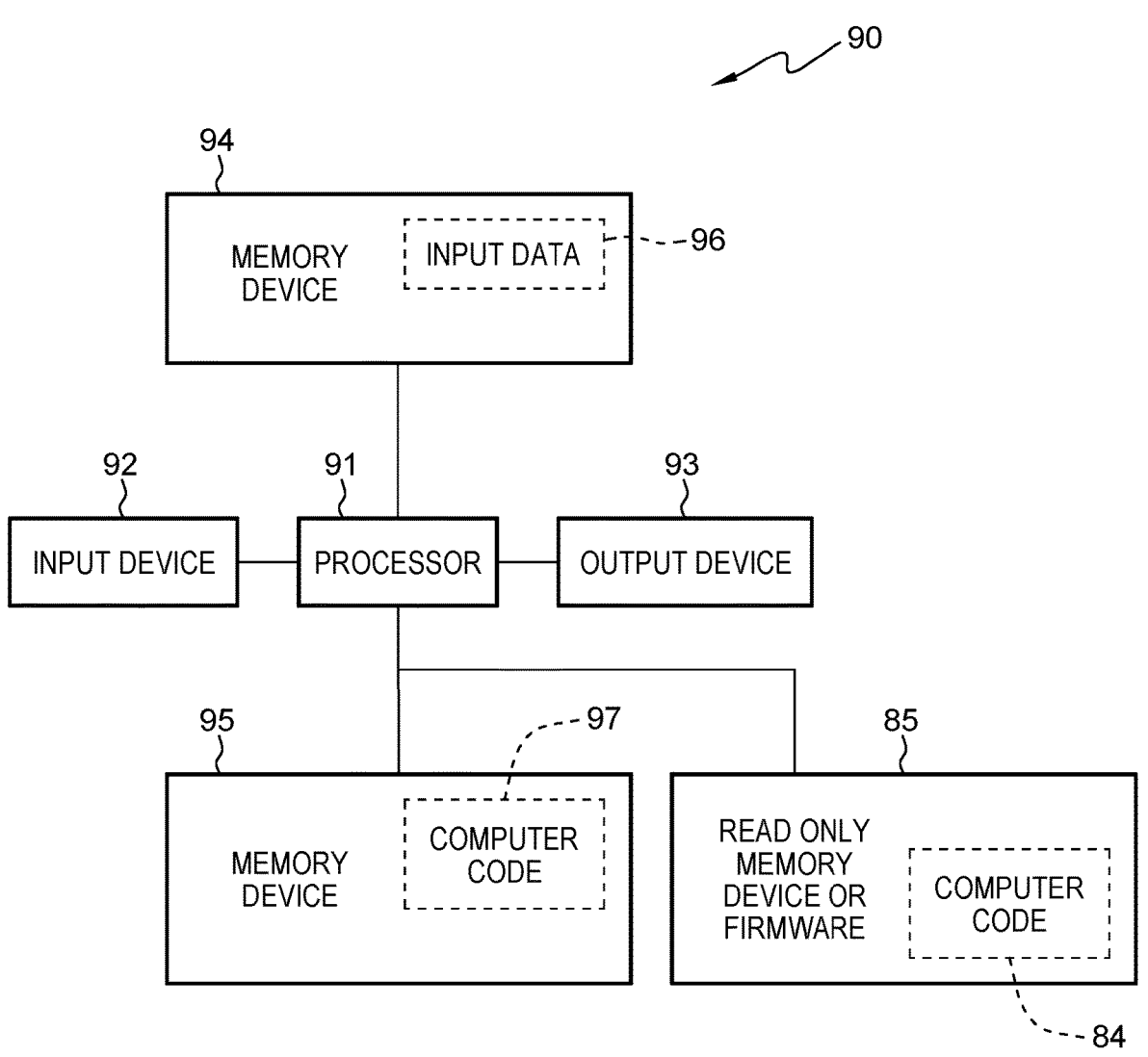
FIG. 6 illustrates a computer system used by the system of FIG. 1 for improving software technology associated with identifying a specified format for generating a summary for digital textual content generating an automated digital summary of the digital textual content thereby enabling optimized operational functionality of a recurrent neural network (RNN) encoder-decoder hardware device, in accordance with embodiments of the present invention.

FIG. 6 illustrates a computer system 90 (e.g., RNN encoder-decoder hardware device 139 and GUI hardware interface 115 of FIG. 1) used by or comprised by the system 100 of FIG. 1 for improving software technology associated with identifying a specified format for generating a summary for digital textual content generating an automated digital summary of the digital textual content thereby enabling optimized operational functionality of a RNN encoder-decoder hardware device, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the fore-going. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may com-prise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote com-puter may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be imple-mented by computer readable program instructions.

These computer readable program instructions may be provided to a processor of a general purpose computer, special purpose computer, or other programmable data pro-cessing device to produce a machine, such that the instruc-tions, which execute via the processor of the computer or other programmable data processing device, create means for implementing the functions/acts specified in the flow-chart and/or block diagram block or blocks. These computer readable program instructions may also be stored in a computer readable storage medium that can direct a com-puter, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process-ing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the blocks may occur out of the order noted in the Figures. For example, two blocks shown in succession may, in fact, be accomplished as one step, executed concurrently, substantially concurrently, in a par-tially or wholly temporally overlapping manner, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with identifying a specified format for generating a summary for digital textual content generating an automated digital summary of the digital textual content thereby enabling optimized operational functionality of a RNN encoder-decoder hardware device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with identifying a specified format for generating a summary for digital textual content generating an automated digital summary of the digital textual content thereby enabling optimized operational functionality of a RNN encoder-decoder hardware device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving software technology associated with identifying a specified format for generating a summary for digital textual content generating an automated digital summary of the digital textual content thereby enabling optimized operational functionality of a RNN encoder-decoder hardware device. In another embodiment, the invention provides a business method that performs the process steps of the invention on a subscription, advertising, and/or fee basis. That is, a service supplier, such as a Solution Integrator, could offer to enable a process for improving software technology associated with identifying a specified format for generating a summary for digital textual content generating an automated digital summary of the digital textual content thereby enabling optimized operational functionality of a RNN encoder-decoder hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
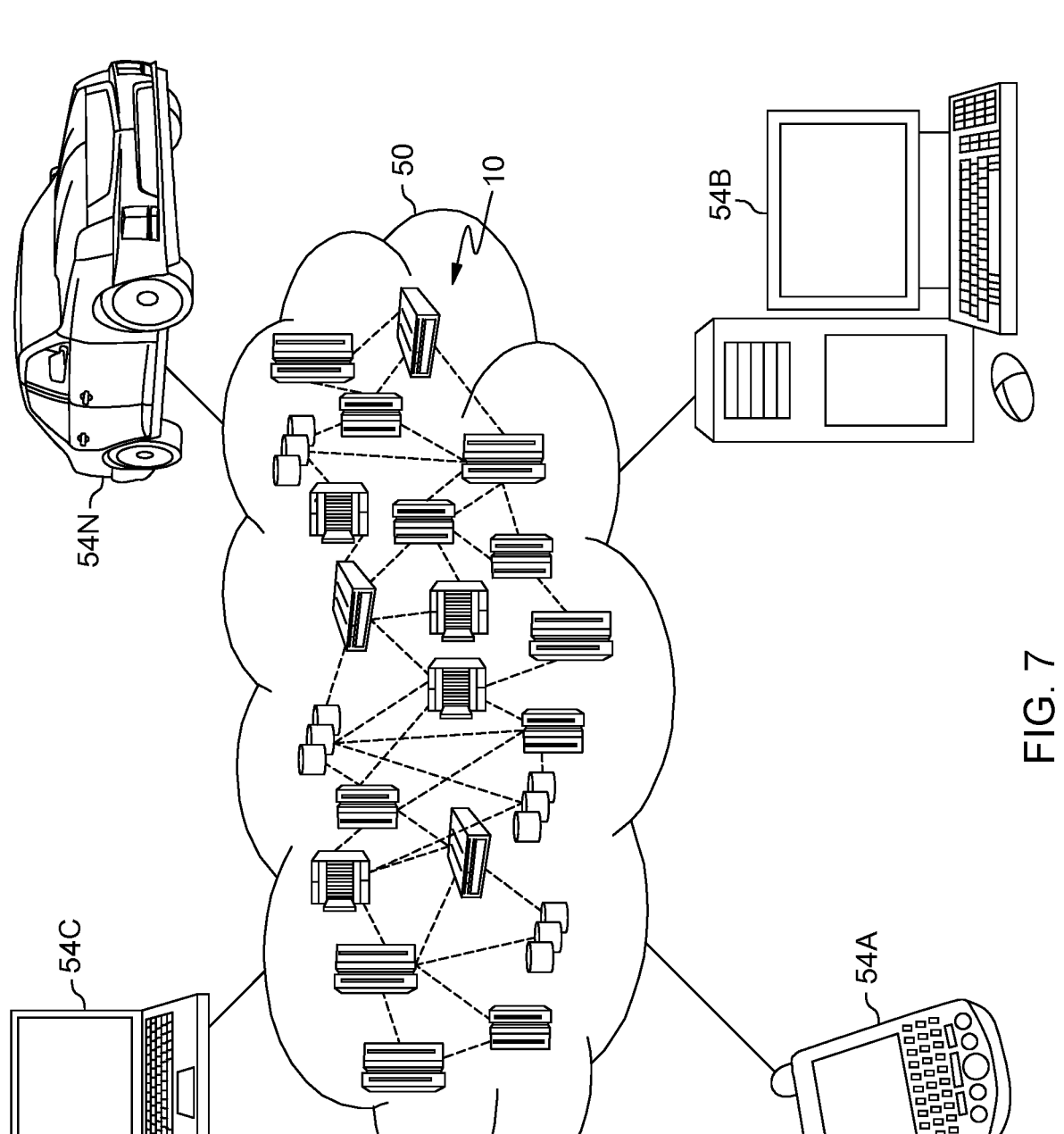
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 8:
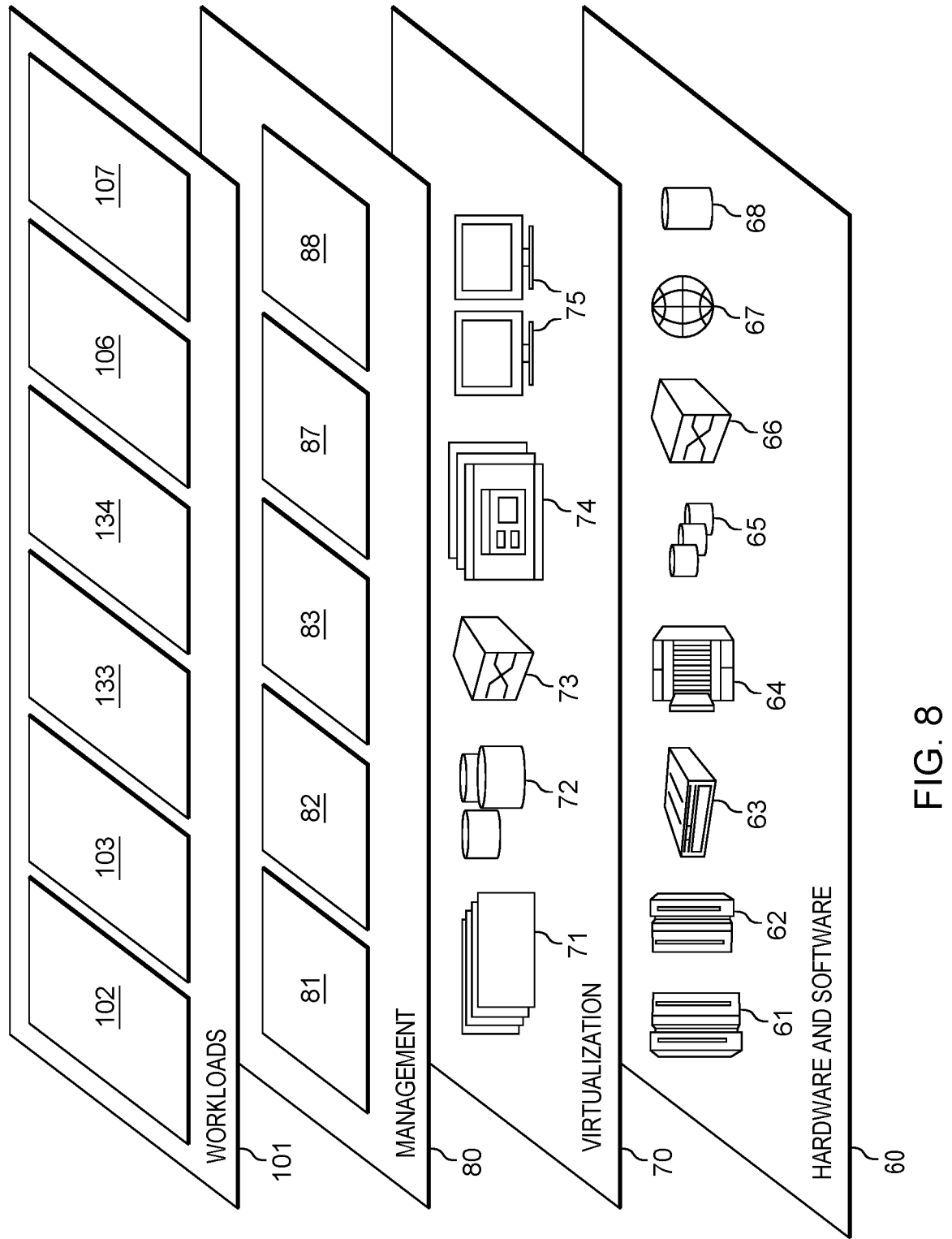
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software technology associated with identifying a specified format for generating a summary for digital textual content generating an automated digital summary of the digital textual content thereby enabling optimized operational functionality of a RNN encoder-decoder hardware device 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A recurrent neural network (RNN) encoder-decoder hardware device comprising:
   one or more processors; and
   one or more memory devices coupled to the one or more processors, wherein the one or more processors are configured to:

receive, during execution of an Internet search process, digital textual content comprising embedded words, morphemes, and phrases;

identify, via executing token appending code, a specified format for generating a summary for the digital textual content, the specified format indicating a word of interest within the digital textual content that is to be retained in the summary for the digital textual content;

prepend a digital start token to a beginning portion of the word of interest and append a digital end token to an ending portion of the word of interest in the digital textual content to obtain modified digital textual content;

generate, via a decoder component of the RNN encoder-decoder hardware device and based at least in part on a context vector corresponding to the modified digital textual content, probability distribution attributes with respect to target vocabulary of the digital textual content;

replace, in response to analysis of the probability distribution attributes, a predicted word of the digital textual content of a time step with a word of target vocabulary with a highest probability distribution attribute of the probability distribution attributes;

generate, based at least in part on replacing the predicted word, an automated digital summary of the digital textual content that includes the word of interest, thereby enabling optimized operational functionality of the RNN encoder-decoder hardware device; and present, to a user via a specialized graphical user interface (GUI), a decoded version of the automated digital summary.

2. The RNN encoder-decoder hardware device of claim 1, wherein the one or more processors, to receive the digital textual content, are configured to:

read, via an encoder component of the RNN encoder-decoder hardware device, source strings of the digital textual content;

encode the source strings with respect to a hidden digital state;

determine importance attributes for each of the source strings with respect to a context vector;

predict, via the decoder component, a next word in the source strings with respect to an associated previous word; and determine a gradient of error of the source strings.

3. The RNN encoder-decoder hardware device of claim 1, wherein the one or more processors, to generate the probability distribution attributes, are configured to:

select top k+n target words, wherein k comprises a user defined beam width, and wherein n comprises a number of words to be retained within the automated digital summary; and feed the top k+n target words into the decoder component.

4. The RNN encoder-decoder hardware device of claim 3, wherein results of feeding the top k+n target words into the decoder component indicate that a group of words of the top k+n target words comprise user word selections.

5. The RNN encoder-decoder hardware device of claim 1, wherein the one or more processors, to replace the predicted word of the digital textual content, are configured to:

compare the probability distribution attributes;

select, in response to results of comparing, the time step associated with a highest probability distribution attribute of the probability distribution attributes; and replace the predicted word of the of the digital textual content in accordance with results of the selecting.

6. The RNN encoder-decoder hardware device of claim 1, wherein the specialized GUI comprises a virtual reality (VR) interface device.

7. The RNN encoder-decoder hardware device of claim 1, wherein the probability distribution attributes comprise conditional probabilities for a given time step, the conditional probabilities being generated based at least in part on predicted words from a previous time step.

8. An automated digital text optimization method comprising:

receiving, by a processor of a recurrent neural network (RNN) encoder-decoder hardware device during execution of an Internet search process, digital textual content comprising embedded words, morphemes, and phrases;

identifying, by the processor via executing token appending code, a specified format for generating a summary for the digital textual content, the specified format indicating a word of interest within the digital textual content that is to be retained in the summary for the digital textual content;

prepending a digital start token to a beginning portion of the word of interest and append a digital end token to an ending portion of the word of interest to obtain modified digital textual content;

generating, by the processor via a decoder component of the RNN encoder-decoder hardware device with respect to the specified format, probability distribution attributes with respect to target vocabulary of the digital textual content;

replacing, by the processor in response to analysis of the probability distribution attributes, a predicted word of the digital textual content of a time step with a word of target vocabulary with a highest probability distribution attribute of the probability distribution attributes;

generating, by the processor, based at least in part on replacing the predicted word, an automated digital summary of the digital textual content that includes the word of interest, thereby enabling optimized operational functionality of the RNN encoder-decoder hardware device; and presenting, by the processor to a user via a specialized graphical user interface (GUI), a decoded version of the automated digital summary.

9. The method of claim 8, wherein the receiving the digital textual content comprises:

reading, via an encoder component of the RNN encoder-decoder hardware device, source strings of the digital textual content;

encoding the source strings with respect to a hidden digital state;

determining importance attributes for each of the source strings with respect to a context vector;

predicting, via the decoder component, a next word in the source strings with respect to an associated previous word; and determining a gradient of error of the source strings.

10. The method of claim 8, wherein the generating the probability distribution attributes comprises:

selecting top k+n target words, wherein k comprises a user defined beam width, wherein n comprises a number of words to be retained within the automated digital summary; and feeding the top k+n target words into the decoder component.

11. The method of claim 10, wherein results of the feeding the top k+n target words into the decoder component indicate that a group of words of the top k+n target words comprise user word selections.

12. The method of claim 8, wherein the replacing the predicted word of the digital textual content comprises:

comparing the probability distribution attributes;

selecting, in response to results of comparing, the time step associated with a highest probability distribution attribute of the probability distribution attributes; and replacing the predicted word of the digital textual content with replacement content in accordance with results of the selecting.

13. The method of claim 8, wherein the specialized GUI comprises a virtual reality (VR) interface device.

14. The method of claim 8, further comprising: providing at least one support service for at least one of creating, integrating, hosting, maintaining, and deploying computer-readable code in the RNN encoder-decoder hardware device, the code being executed by the processor to implement: the receiving, the identifying, the generating the probability distribution attributes, the replacing, the generating the automated digital summary, and the presenting.

15. The method of claim 8, wherein the probability distribution attributes comprise conditional probabilities for a given time step, the conditional probabilities being generated based at least in part on predicted words from a previous time step.

16. A non-transitory computer-readable medium storing a set of instructions for automated digital text optimization, the set of instructions comprising:

one or more instructions that, when executed by one or more processors of a device, cause the device to:

receive, during execution of an Internet search process, digital textual content comprising embedded words, morphemes, and phrases;

identify, via executing token appending code, a specified format for generating a summary for the digital textual content, the specified format indicating a word of interest within the digital textual content that is to be retained in the summary for the digital textual content to obtain modified digital textual content;

prepend a digital start token to a beginning portion of the word of interest and append a digital end token to an ending portion of the word of interest;

generate, via a decoder component of a RNN encoder-decoder hardware device and based at least in part on a context vector corresponding to the modified digital textual content, probability distribution attributes with respect to target vocabulary of the digital textual content;

replace, in response to analysis of the probability distribution attributes, a predicted word of the digital textual content of a time step with a word of target vocabulary with a highest probability distribution attribute of the probability distribution attributes;

generate, based at least in part on replacing the predicted word, an automated digital summary of the digital textual content that includes the word of interest, thereby enabling optimized operational functionality of the RNN encoder-decoder hardware device; and present, to a user via a specialized graphical user interface (GUI), a decoded version of the automated digital summary.

17. The non-transitory computer-readable medium of claim 16, wherein the one or more instructions, to receive the digital textual content, cause the device to:

read, via an encoder component of the RNN encoder-decoder hardware device, source strings of the digital textual content;

encode the source strings with respect to a hidden digital state;

determine importance attributes for each of the source strings with respect to a context vector;

predict, via the decoder component, a next word in the source strings with respect to an associated previous word; and determine a gradient of error of the source strings.

18. The non-transitory computer-readable medium of claim 16, wherein the one or more instructions, to identify the specified format, cause the device to:

prepend digital start tokens to a beginning portion of words of interest of the digital textual content; and append digital end tokens to an ending portion of the words of interest of the digital textual content.

19. The non-transitory computer-readable medium of claim 16, wherein the one or more instructions, to generate the probability distribution attributes, cause the device to:

select top k+n target words, wherein k comprises a user defined beam width, wherein n comprises a number of words to be retained within the automated digital summary; and feed the top k+n target words into the decoder component.

20. The non-transitory computer-readable medium of claim 19, wherein results of the feeding the top k+n target words into the decoder component indicate that a group of words of the top k+n target words comprise user word selections.

* * * * *